Figure 1:
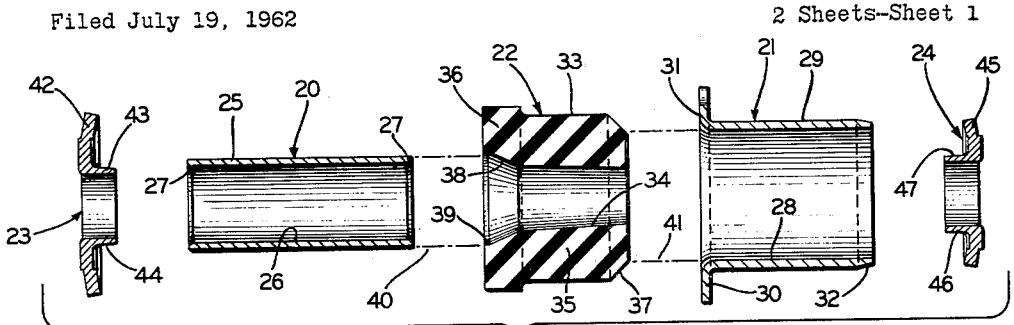

Jan. 18, 1966   R. F. SIMPSON   3,230,000
RESILIENT BUSHING MANUFACTURE
Filed July 19, 1962   2 Sheets-Sheet 1

INVENTOR.
Robert F. Simpson
BY
Frease, Bishop, Johns & Schick
ATTORNEYS

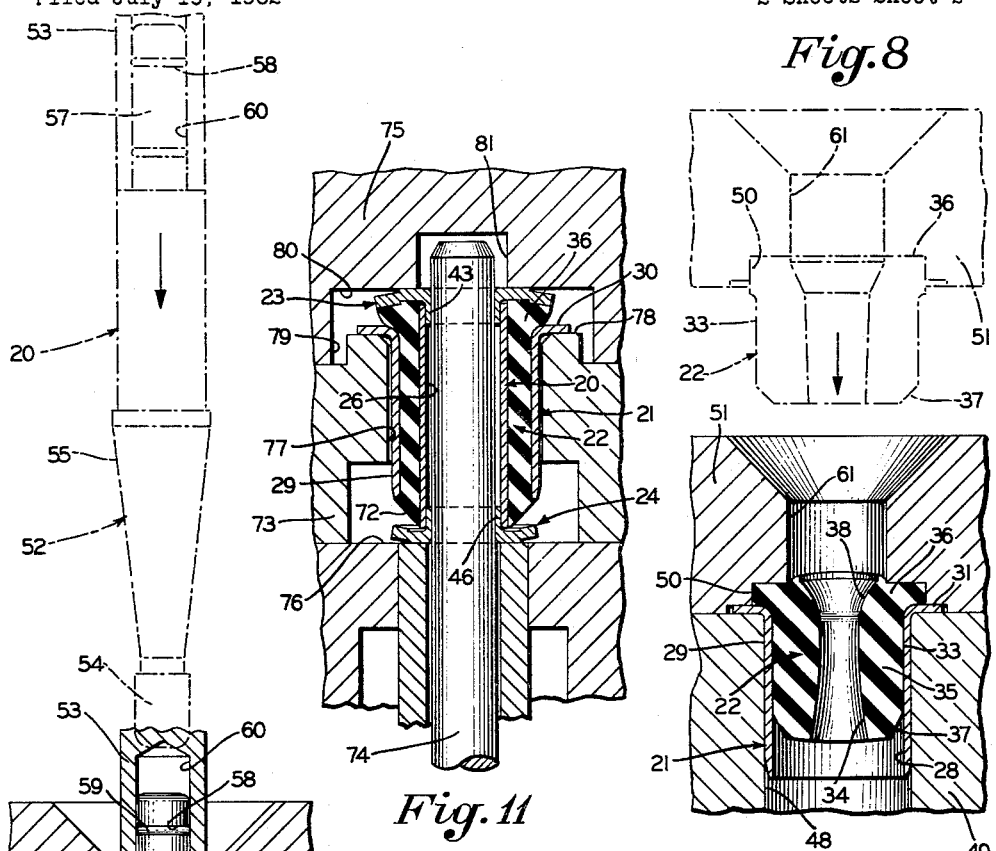
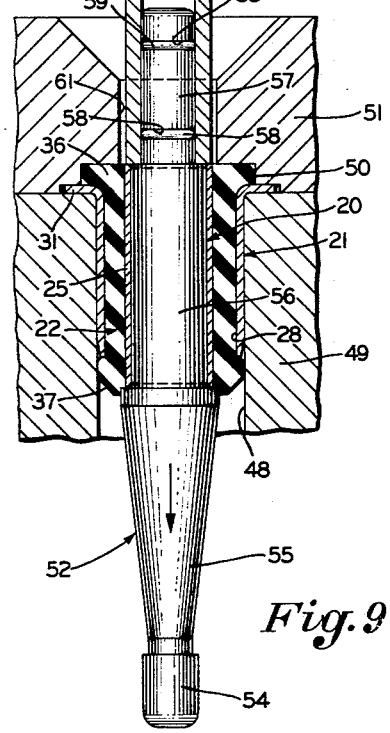
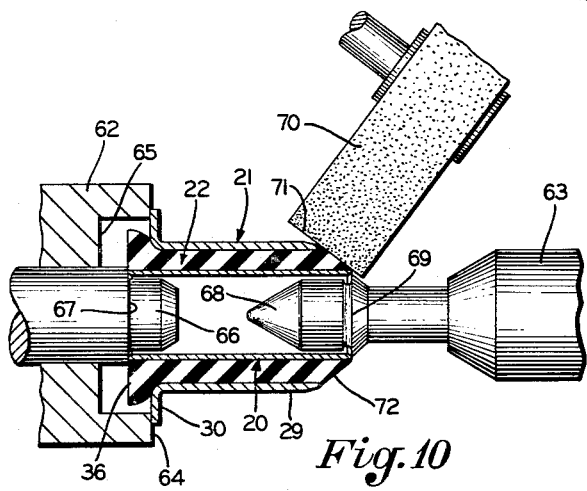

United States Patent Office 3,230,000
Patented Jan. 18, 1966

1

3,230,000
RESILIENT BUSHING MANUFACTURE
Robert F. Simpson, Hartville, Ohio, assignor to The Monarch Rubber Company, Hartville, Ohio, a corporation of Ohio
Filed July 19, 1962, Ser. No. 211,020
3 Claims. (Cl. 287—85)

My invention relates to improvements in resilient bushing manufacture, and more specifically to bushings of the type having telescoped inner and outer sleeves with a rubber-like bushing positioned therebetween under radial compression by the outer sleeve and radial expansion by the inner sleeve, resulting in substantial axial elongation. Even more specifically, my invention relates to resilient bushings of the foregoing type in which both the outer sleeve and rubber-like bushing are provided with abutting radially outwardly extending flanges at one end thereof.

Many prior constructions of resilient bushings have been provided comprised of telescoped inner and outer metal sleeves between which rubber-like bushings are positioned under inward radial compression and outward radial expansion resulting in axial elongation of the rubber-like member between the metal members. Bushings of this type are very commonly used, particularly in suspension systems of modern automobiles, wherein the outer sleeve is gripped by one member, the inner sleeve is gripped by another member, and limited relative motion is permitted between these members gripping the various bushing metal sleeves as a result of the resiliency of the rubber-like bushing positioned therebetween.

The present invention deals with resilient bushing of this general type in which the inner metal sleeve is formed of a greater axial length than the axial length of the larger diameter outer metal sleeve. Furthermore, the outer metal sleeve normally terminates at one end in a radially outwardly extending flange and at the other end in a plain cylindrical end portion. Finally, the inner sleeve may have radially outwardly extending flanged caps at either end, spaced axially from the ends of the larger outer sleeve, with the rubber-like bushing having a radially outwardly flanged end portion preferably compressed between the inner sleeve cap and the outer sleeve flange, and a second end portion positioned between the plain end of the outer sleeve and the inner sleeve cap.

One of the major goals of all resilient bushing constructions of this type is to provide the maximum of flexing life prior to failure, and particularly at a minimum of original cost for provision thereof. With this in mind, many and varied innovations have been suggested.

For instance, many different forms of the rubber-like bushing part have been fabricated having particular configurations in the free state in order that these rubber-like bushings will remain properly assembled once placed in the assembled position and over the life of the overall bushing construction. These, however, have not increased the wearing life of the particular bushing construction and in many cases have diminished the same.

It is, therefore, a general object of the present invention to provide a resilient bushing construction, preferably formed of telescoped metal sleeves having a rubber-like bushing positioned therebetween, in which the wearing or flexing life of the bushing is greatly increased over that which has heretofore been possible of attainment.

It is a primary object of the present invention to provide a resilient bushing construction of the foregoing type, and a method for manufacturing the same, in which, by a simple manufacturing step during the assembling thereof, it is possible to greatly increase the wearing life.

2

It is a further object of the present invention to provide a resilient bushing construction of the foregoing type, and a method for manufacturing the same, in which certain stresses set up in the rubber-like bushing portion are relieved by a simple manufacturing step during assembling, thereby greatly increasing the wearing life of the final bushing construction.

Finally, it is an object of the present invention to provide a resilient bushing construction, and method for manufacturing the same, accomplishing all of the foregoing objects at a nominal production expense.

These and other objects are accomplished by the parts, constructions, arrangements, combinations, subcombinations, methods and procedures comprising the present invention, a preferred embodiment of which— illustrative of the best mode in which applicant has contemplated applying the principles—is set forth in the following description and illustrated in the accompanying drawings, and which is particularly and distinctly pointed out and set forth in the appended claims forming a part hereof.

In general terms, the resilient bushing construction comprising the present invention may be stated as including an inner, preferably sleeve-like member having an outer cylindrical surface, with this inner member preferably having first and second generally radially extending flanges mounted at first and second ends, respectively, thereof and extending radially outwardly from the outer cylindrical surface. The construction further includes an outer member positioned telescoped with the inner member with this outer member having an inner cylindrical surface extending co-axially with and spaced radially outwardly from the outer surface of the inner member.

Still further, this inner surface of the outer member terminates at a first end of the outer member axially short of the first end of the inner member and also axially short of the inner member outer surface, and at this point, the outer member first end is formed into a generally radially outwardly extending flange spaced axially from the inner member first flange. Also, the inner surface of the outer member terminates at a second end of the outer member axially short of the inner member second end and also axially short of the inner member outer surface, so that this second end of the outer member is spaced axially from the inner member second flange.

A rubber-like bushing is positioned between the inner and outer member surfaces, with this rubber-like bushing having a body portion expanded radially outwardly by the inner member and compressed radially inwardly by the outer member and, therefore, axially elongated between the inner and outer member surfaces. This bushing terminates at the inner member first end in a radially outwardly extending flange portion which is positioned axially between, and is preferably somewhat axially compressed between, the inner member first flange and the outer member flange portion so as to compressively abut this outer member flange portion.

Finally, this rubber-like bushing terminates at the inner member second end in an inwardly angled, preferably ground, stress relieved surface, which surface angles inwardly from the outer member second end and axially between the outer member second end and the inner member second flange. For maximum results, it is preferred that this stress relieved angled surface of the rubber-like bushing extends from the outer member second end and angles inwardly to the inner member second end to the line of juncture between the inner member outer surface and inner member second flange, thereby, although being inwardly angled, extending axially substantially the total axial distance between the outer member second end and the inner member second flange.

The method comprising the present invention for assembling the foregoing resilient bushing construction may be stated as including the steps of assembling the inner member telescoped within the outer member, with the rubber-like bushing extending axially therebetween, expanded radially outwardly by the inner member outer surface and compressed radially inwardly by the outer member inner surface and axially elongated between said surfaces. Further, the method includes the step of, during this assembling, positioning the rubber-like bushing flanged end axially compressively abutting the outer member flange, radially outwardly of the inner member outer surface, and also during this assembling, positioning a part of the rubber-like bushing as a result of the axial elongation thereof axially overhanging the outer member second end, or the outer member end opposite from the flanged end, with this axially overhanging also being radially outward of the inner member outer surface.

Finally, the method includes the step of removing a part of the rubber-like material from the overhanging part of the rubber-like bushing forming an inward angled portion of rubber-like material extending from the outer member second end inwardly toward the inner member outer surface. This removal of rubber-like material is performed after the assembling of the first and second members and the rubber-like bushing, and is preferably accomplished by a grinding or equivalent operation.

Also, generally radially outwardly extending flanges may be formed at either end of inner member extending radially outwardly from the inner member outer surface. One of these inner member flanges may be preferably formed somewhat compressing the rubber-like bushing flanged end axially against the outer member flange. At the other inner member flange, the removal of the part of the rubber-like bushing preferably forms the inward angled portion of the rubber-like bushing extending from the outer member inner surface to the line of juncture between the inner member outer surface and inner member flange and, therefore, totally axially between the outer member inner surface and the inner member flange.

Figure 2:
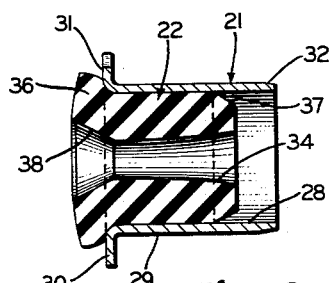
Figure 3:
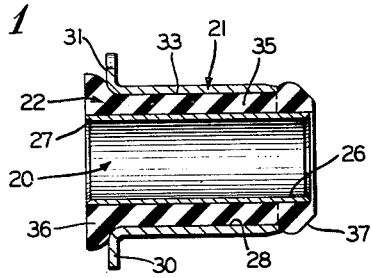
Figure 4:
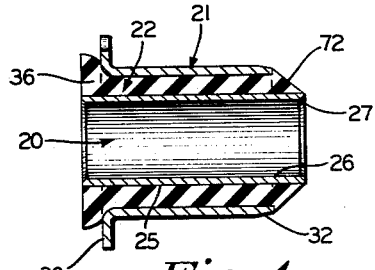
Figure 5:
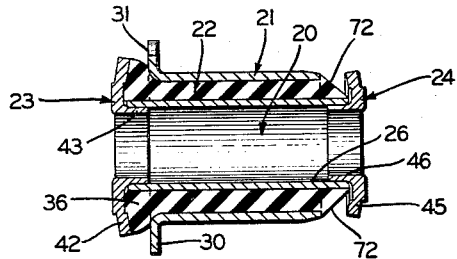
Figure 6:
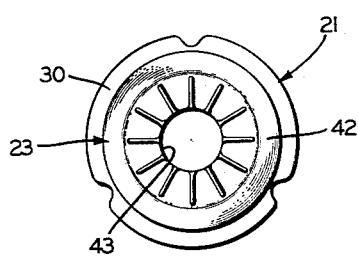
Figure 7:
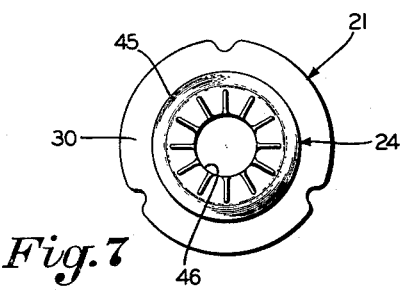

By way of example, an embodiment of the resilient bushing construction and method of the present invention is illustrated in accompanying drawings forming a part hereof, wherein like numerals indicate similar parts throughout the several views, and in which:

FIG. 1 is a vertical sectional exploded view of the resilient bushing construction of the present invention showing the various parts in position for assembling and with the rubber-like bushing in the free state;

FIG. 2, a vertical sectional view showing the part from the first assembly step in which the rubber-like bushing is assembled in the outer sleeve member;

FIG. 3, a vertical sectional view showing the part from the second assembly step in which the inner sleeve has been assembled in the part of FIG. 2;

FIG. 4, a vertical sectional view showing the part of FIG. 3 after the removal of the part of the rubber-like bushing providing the angled surface between the inner and outer members;

FIG. 5, a vertical sectional view showing the part of FIG. 4 after the final assembly step with the inner member flanges in place;

FIG. 6, an end view looking at the left-hand end of the final assembled part of FIG. 5;

FIG. 7, an end view looking at the right-hand end of the final assembled part of FIG. 5;

FIG. 8, a vertical sectional view illustrating the first assembly step to form the part of FIG. 2;

FIG. 9, a vertical sectional view, part in elevation, illustrating the second assembly step for providing the part of FIG. 3;

FIG. 10, a vertical sectional view, part in elevation, illustrating the step of removing the part of the rubber-like bushing to form the inwardly angled surface between the outer and inner members and to form the part of FIG. 4 from the part of FIG. 3; and FIG. 11, a vertical sectional view, part in elevation, illustrating the final assembly step of assembling the flanges on the ends of the inner member to form the final assembled part of FIG. 5.

The various parts of the resilient bushing construction of the present invention prior to assembly are shown in FIG. 1 and include an inner cylindrical sleeve member, generally indicated at 20, an outer cylindrical sleeve member, generally indicated at 21, a rubber-like bushing, generally indicated at 22, a first end flange for the inner member, generally indicated at 23, and a second end flange for the inner member, generally indicated at 24. The inner member 20, outer member 21, and flanges 23 and 24 may be formed of metal, such as steel, and the rubber-like bushing 22 may be formed of the usual resilient materials, such as rubber, synthetic rubber or plastic.

The inner member 20 is formed with a plain outer cylindrical surface 25 and a plain inner cylindrical bore 26, with the ends of this member at the ends of the bore 26 being slightly chamfered, as at 27, for convenience during assembly operations. As shown, the overall axial length of this inner member is somewhat greater than that of the outer member for properly accomplishing the assembled part, as will be hereinafter described in detail.

The outer member 21 is generally sleeve-like having a plain inner cylindrical surface 28 and an outer cylindrical surface 29, and this member terminates at the left-hand end, as shown in FIG. 1, in a radially outwardly extending flange 30, providing a radially outwardly extending flange end surface 31 arcuately joining the termination of the inner cylindrical surface 28. At the right-hand, as shown in FIG. 1, this outer member is formed with a slightly tapered or inwardly angled surface 32 at the right-hand termination of the outer surface 29. Still further, the diameter of the inner cylindrical surface 28 of outer member 21 is a predetermined amount larger than the outer cylindrical surface 25 of the inner member 20.

The rubber-like bushing 22 is formed with an outer cylindrical surface 33 and an inner surface 34 on a body portion 35, with this body portion terminating at the left-hand end, as shown in FIG. 1, in a radially outwardly extending flange portion 36. The outer cylindrical surface 33 may be of substantially uniform dimensions throughout, blending arcuately into the flange portion 36 at the left-hand end of bushing 22 and terminating at the right-hand end thereof in an inwardly angled surface 37, forming the right-hand termination of the bushing.

The inner surface 34 of bushing 22 throughout the body portion 35 may taper slightly from left to right, as shown in FIG. 1, thereby being of slightly lesser dimensions at the right-hand end of bushing 22 than at the flange portion 36. This inner surface 34 continues this slight taper to the left a short distance into the flange portion 36, then is angled or tapered outwardly, as at 38, a greater degree to the left throughout the major part of the flange portion 36, terminating at the left-hand end of the bushing 22 in a short cylindrical surface 39.

It is important to note, for purposes of the present invention, that the outer cylindrical surface 25 of the inner member 20 is considerably larger than the inner surface 34 of bushing 22, as is clearly indicated by the broken lines 40 in FIG. 1. Furthermore, the outer surface 33 of bushing 22 is considerably larger than the inner cylindrical surface 28 of the outer member 21, as is clearly indicated by the broken lines 41 in FIG. 1.

The first end flange 23 is formed with the radially outwardly extending flange portion 42 and the relatively short sleeve portion 43, with the sleeve portion 43 having a slightly tapered outer surface 44 of proper dimensions for being received with a press fit axially within the left-hand end of the inner cylindrical bore 26 of the inner member 20. The second end flange 24 is formed similar to the first end flange 23 having the flange portion 45, the sleeve portion 46, and the outer surface 47 on the sleeve portion of substantially the same dimensions for being received with a press fit in the right-hand end of the inner cylindrical bore 26 of the inner member. The flange portion 42 of the first end flange 23 is of larger overall dimensions than the flange portion 45 of the second end flange 24 so that these flange portions will conform, as desired, to the various portions of the bushing 22 in the final assembled part, as will be hereinafter more clearly seen.

The apparatus for performing the first of the assembly steps is illustrated in FIG. 8, providing the final assembled part shown in FIG. 2. In this first assembly step, the outer member 21 is received downwardly into a bore 48 of a lower assembly die 49. Also, the flange portion 36 of the rubber-like bushing 22 is received with a slight interference fit upwardly into a bore 50 of an upper assembly die 51, with this upper assembly die, at this point, being spaced above the lower assembly die 49, as indicated by the broken lines in FIG. 8.

Thus, when the upper assembly die is moved downwardly against the lower assembly die 49, the rubber-like bushing 22 is forced downwardly into the outer member 21, so that this outer member radially compresses the body portion 35 of this bushing and also slightly axially elongates this body portion. This assembly operation also axially abuts the bushing flange portion 36 against the flange end surface 31 of outer member 21, as shown. The inwardly angled surface 37 of bushing 22, of course, aids greatly in the entry of this bushing downwardly into the lesser diameter outer member 21.

As illustrated in FIG. 9, with the final assembled part being shown in FIG. 3, the next assembly step is accomplished while the lower and upper assembly dies 49 and 51 of the first assembly step remain closed, and this second assembly step is accomplished by the shooter, generally indicated at 52, which is moved vertically downwardly by a holder 53. As shown in FIG. 9, the shooter 52 includes a lower cylindrical end portion 54, a tapered expanding portion 55, a recessed cylindrical portion 56, and an upper holding portion 57.

The recessed cylindrical portion 56 of shooter 52 is dimensioned for receiving the inner member 20 slidably thereover, with the lower end of this inner member abutting the upper end of the shooter tapered portion 55, as shown in FIG. 9. Furthermore, the holding portion 57 of shooter 52 is provided with a pair of spaced O-ring slots 58 for receiving the rubber O-rings 59 therein, and this holding portion 57 further is dimensioned for being received slidably upwardly into a cylindrical bore 60 in the holder 53, as shown, with the O-rings 59 releasably retaining the holder and shooter assembled.

A smaller diameter bore 61 is formed through the upper assembly die 51 from the bore 50 upwardly, and this bore 61 is of sufficient size so as to receive the shooter 52 and a portion of the holder 53 downwardly therethrough. Thus, the second operation is performed immediately following the first operation and while the lower and upper assembly dies 49 and 51 remain in closed position.

Prior to the shooter 52 being inserted in the holder 53, the inner member 20 is telescoped downwardly over the shooter holding portion 57 onto the recessed cylindrical portion 56 to the position shown in FIG. 9, that is, downwardly axially against the shooter tapered portion 55. Thereafter, the shooter holding portion 57 is inserted upwardly into the bore 60 of holder 53 and at this time, the holder is spaced above both the lower and upper assembly dies 49 and 51, as indicated by the broken lines in FIG. 9.

Finally, with the lower and upper assembly dies 49 and 51 remaining closed retaining the partially assembled part shown in FIG. 2, the shooter 52 with the inner member 20 thereon is moved downwardly through the bore 61 in the upper assembly die 51. The cylindrical end portion 54 of the shooter 52 first enters the outward tapered portion 38 on the rubber-like bushing 22, with continued downward movement of this shooter causing the shooter tapered portion 55 to progressively radially outwardly expand the rubber-like bushing and ultimately position the shooter recessed cylindrical portion 56 within this rubber-like bushing and telescoped with the outer member 21, thereby properly positioning the inner member 20 within the rubber-like bushing and telescoped with the outer member providing the part shown in FIG. 3.

It will be noted at this point that the flange portion 36 of the rubber-like bushing 22 tightly axially abuts the flange end surface 31 of outer member 21 radially outwardly of the inner member outer surface 25, since the inner member is longer and therefore axially overhangs the outer member. Furthermore, it will be noted that at the right-hand ends of these members, the bushing 22 overhangs and is bulged outwardly of the outer member 21 and this bulging or overhang is radially outwardly of the inner member outer surface 25, since again the inner member is longer than the outer member and axially overhangs this outer member.

Thus, after this second assembly operation, the rubber-like bushing 22 is radially compressed by the outer member inner surface 28, is radially expanded by the inner member outer surface 25, and is, therefore, axially elongated, so as to extend axially beyond the outer member 21 but radially outwardly of the inner member 20. As shown in FIGS. 3 and 9, note that in this assembled part, the bushing has elongated axially sufficient that the inwardly angled end surface 37 of the rubber-like bushing 22 is now positioned spaced axially outwardly from the end of the outer member 21. It is believed that this external radial compression, internal radial expansion and axial elongation of the rubber-like bushing 22 sets up certain stresses within this bushing which, if not relieved, can cause early failure of the resilient bushing construction during the operational flexing thereof.

The next operation on the bushing construction is shown in FIG. 10, to provide the part of FIG. 4, and in this operation, the part of FIG. 3 is positioned held axially between the rotating grinding dies 62 and 63. As shown, the die 62 has a radial end surface 64, a cylindrical recess 65 and a pilot pin 66 having the annular shoulder 67. The die 63 has the pilot pin 68 with the annular shoulder 69, with both of these dies being rotatable and either or both rotatably driven.

In this grinding operation, the part of FIG. 3 is assembled between the grinding dies 62 and 63 with the outer member flange 30 abutting the radial end surface 64 of die 62, the pilot pin 66 of die 62 received within the end of the inner member 20, and with this inner member axially abutting the shoulder 67 of this pilot pin 66. At the same time, the pilot pin 68 of die 63 is received within the opposite end of the inner member 20 with this end of the inner member abutting the shoulder 69 of pilot pin 68.

In this manner, the part of FIG. 3 is axially held and rotated and a grinding or cutting wheel 70 having an angled grinding or cutting surface 71 is moved inwardly against the part of the rubber-like bushing 22 bulging outwardly from the straight or right-hand end of the outer member 21. This cutting or grinding wheel may be of various compositions dependent on the particular rubber-like material making up the rubber-like bushing 22, and wheel 70 may be rotatably driven in a reverse direction to the driving of the dies 62 and 63 and, therefore, the part of FIG. 3.

Thus, as this wheel is moved inwardly against this bulging part of the rubber-like bushing 22, the part of this rubber-like bushing, at an inward angle between the end of the outer member 21 and the end of the inner member 20, will be removed by cutting or grinding, dependent on the composition of wheel 70. This results in the part shown in FIG. 4 having the inwardly angled surface 72 preferably angling inwardly from the end of the outer member 21 to end of the inner member 20.

The final assembly operation to provide the part shown in FIG. 5 is accomplished by the apparatus illustrated in FIG. 11, which apparatus includes a lower assembly die 73 having the vertically upwardly extending pilot pin 74, and the upper assembly die 75. The lower assembly die 73 is formed with a lower pressure surface 76, a bore 77 of a size for receiving the outer member 21 therein, and an upper pressure surface 78. The upper assembly die 75 is formed with a cylindrical recess 79 having a pressure surface 80 and a clearance recess 81, as shown.

In this final assembly operation, with the upper assembly die 75 raised above the lower assembly die 73, the second end flange 24 is positioned over the pilot pin 74, with the sleeve portion 46 of this second end flange extending upwardly, and with this second end flange resting on the lower pressure surface 76 of the lower assembly die 73. Next, the part of FIG. 4 is positioned downwardly over the pilot pin 74 with the sleeve portion 46 of the second end flange 24 beginning to enter the inner cylindrical bore 26 of that end of the inner member 20 radially inwardly from the angled surface 72 cut on the end of the rubber-like bushing 22.

At this point, the flange 30 of the outer member 21 is spaced above the upper pressure surface 78 of the lower assembly die 73. Next, the first end flange 23 is positioned downwardly over the pilot pin 74 with the sleeve portion 43 of this first end flange extending downwardly and beginning to enter that end of the inner cylindrical bore 26 of the inner member 20 radially inwardly from the flange portion 36 on the rubber-like bushing 22.

Finally, the upper assembly die 75 is moved downwardly, bottoming on the lower assembly die 73, with the upper end of the pilot pin 74 being received into the clearance recess 81 of the upper assembly die 75, and through the cooperation of the lower pressure surface 76 of the lower assembly die 73 and the pressure surface 80 of the upper assembly die 75 bearing against the second and first end flanges 24 and 23, respectively, these end flanges are assembled by press fits into final positions to provide the final assembled part shown in FIG. 5. Furthermore, in this final assembling stroke, the outer member flange 30 finally seats against the upper pressure surface 78 of the lower assembly die 73, as shown, thereby maintaining the proper relative positioning of all of the parts of the bushing construction. The final telescopic entering of the first end flange sleeve portion 43 and second end flange sleeve portion 46 into the inner cylindrical bore 26 of the inner member 20 is, of course, aided by the chamfering 27 at the ends of the inner member bore.

The most important feature of the resilient bushing construction and method of the present invention is the provision of the inwardly angled cut or ground stress relieved surface 72 on the rubber-like bushing 22, as described. It is known that the provision of this inwardly angled surface 72 adds greatly to the flexing life of the final resilient bushing construction.

For instance, it is known that the final assembled part shown in FIG. 5, having the bushing inwardly angled surface 72 formed thereon after the assembly of the inner member 20, outer member 21 and rubber-like bushing 22, has a greatly superior flexing life over a resilient bushing formed merely in the manner shown in FIG. 3 with the first and second end flanges 23 and 24 assembled thereon and without forming the inwardly angled surface 72 on the rubber-like bushing 22.

Furthermore, it is known that the resilient bushing formed according to the principles of the present invention will have a far superior flexing life over a resilient bushing having a similar surface to the angled surface 72 originally molded on this rubber-like bushing and merely being properly positioned solely from the assembly operations. In other words, it is known that it is essential to remove the part of the rubber-like bushing 22 to form the inwardly angled surface 72 on this rubber-like bushing after the rubber-like bushing has been radially compressed, radially expanded and axially elongated between the inner and outer members 20 and 21, and originally molding this angled surface on the bushing will not provide the same results.

It is believed that the reason for the improved results of the resilient bushing construction of the present invention is that during the radial compression, radial expansion and axial elongation of the rubber-like bushing 22, when this rubber-like bushing is assembled between the inner and outer members 20 and 21, certain stresses are set up in this rubber-like bushing 22 which are detrimental to the flexing life thereof, and that by removing the bulging portion of the rubber-like bushing to form the inwardly angled surface 72 after assembly of these parts and after the compression, expansion, and elongation relieves at least certain of these detrimental stresses. Thus, the overall flexing life of the resilient bushing construction of the present invention is greatly increased over similar resilient bushing construction formed in other manners.

Although the removal of the bulging portion of the rubber-like bushing 22 to form the inwardly angled surface 72 has been illustrated in FIG. 10 as being accomplished by use of a cutting wheel 70 which will cut by abrasion or grinding, other known means for removal of a portion of this rubber-like bushing 22 at this point could be used, and it is not intended to limit the principles of the present invention to the particular apparatus and method shown. Thus, the terms "grinding" or "ground surface" are intended to cover any material removing means providing similar stress relieving results to form the stress relieved surface.

Furthermore, in the final resilient bushing shown in FIG. 5, the inwardly angled surface 72 provided according to the principles of the present invention is clearly recognizable and different in surface appearance from a similar surface molded directly on a rubber-like bushing prior to assembly and properly positioned during assembly. It is believed that such a molded surface will more completely retain, if not add to and compound the stresses set up in the rubber-like bushing, rather than relieve such stresses.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction and method illustrated and described herein is by way of example and the scope of the present invention is not limited to the exact details of the construction shown.

Having now described the invention, the construction, the methods and procedures, operation and use of the preferred embodiment thereof, and the advantageous new and useful results obtained thereby, the new and useful construction and methods, and reasonable mechanical equivalents thereof obvious to those skilled in the art are set forth in the appended claims.

I claim:

1. Resilient bushing construction including an inner member having an outer cylindrical surface, a first generally radially extending flange mounted on a first end of the inner member extending radially outward from an end of the outer cylindrical surface, a second generally radially extending flange mounted on a second end of the inner member extending radially outward from an end of the outer cylindrical surface, an outer member positioned telescoped with the inner member and having an inner cylindrical surface extending co-axially with and spaced radially outwardly from the outer surface of the inner member, the inner surface of the outer member terminating at a first end of the outer member axially short of the end of the outer surface of the inner member and in a generally radially outwardly extending flange spaced axially from the inner member first flange, the inner surface of the outer member terminating at a second end of the outer member axially short of the end of the outer surface of the inner member and spaced axially from the inner member second flange, a rubber-like bushing positioned between the inner and outer members having a body portion deformed radially outwardly and deformed radially inwardly resulting in being axially elongated between the outer surface of the inner member and the inner surface of the outer member, the bushing terminating at the inner member first end in a radially outwardly extending flange portion axially between the inner member first flange and the outer member flange portion and compressively abutting said outer member flange portion, and the bushing terminating at the inner member second end in an inwardly angled ground stress-relieved surface angling inwardly from the outer member second end and axially between the outer member second end and the inner member second flange.

2. Resilient bushing construction as defined in claim 1 in which the bushing angled surface extends from the outer member second end and angles inwardly to the inner member second end substantially to the line of juncture between the end of the inner member outer surface and inner member second flange.

3. Resilient bushing construction as defined in claim 1 in which the inner member first and second flanges are each separately formed from the inner member having generally radially extending flange portions and generally axially extending sleeve portions; in which the sleeve portions of the inner member first and second flanges are press fitted within a generally cylindrical bore of the inner member at the inner member first and second ends; in which the bushing flange portion is positioned extending totally axially between the inner member first flange and the outer member flange portion; and in which the bushing angled surface extends from the outer member second end and angles inwardly to the inner member second end substantially to the line of juncture between the end of the inner member outer surface and the flange portion of the inner member second flange.

References Cited by the Examiner
UNITED STATES PATENTS

| | | | |
|---|---|---|---|
| 2,763,055 | 9/1956 | Hardy | 29—450 |
| 2,858,155 | 10/1958 | Peppercorn | 287—85 |
| 2,930,640 | 3/1960 | Davis et al. | 287—85 |
| 3,028,665 | 4/1962 | Hirst | 29—450 |

CARL W. TOMLIN, *Primary Examiner.*